United States Patent
Li

(10) Patent No.: US 8,247,490 B1
(45) Date of Patent: Aug. 21, 2012

(54) ADHESION COMPOSITION AND TEXTILE MATERIALS AND ARTICLES TREATED THEREWITH

(75) Inventor: Shulong Li, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 13/029,316

(22) Filed: Feb. 17, 2011

(51) Int. Cl.
*C08K 3/20* (2006.01)

(52) U.S. Cl. .......................... 524/510; 524/501

(58) Field of Classification Search .................. 524/510
See application file for complete search history.

(56) References Cited

U.S. PATENT DOCUMENTS

| | | | |
|---|---|---|---|
| 3,268,467 A | 8/1966 | Rye et al. ............... | 260/29.3 |
| 3,963,652 A | 6/1976 | Tanimura et al. ........ | 260/3 |
| 4,009,134 A | 2/1977 | Elmer .................... | 260/29.3 |
| 4,053,447 A * | 10/1977 | Shea ...................... | 524/594 |
| 4,076,873 A | 2/1978 | Shea ...................... | 428/35 |
| 4,132,693 A * | 1/1979 | Bhakuni et al. ......... | 524/510 |
| 4,238,379 A | 12/1980 | Reinhart, Jr. ........... | 260/29.3 |
| 4,285,850 A | 8/1981 | Neubert ................ | 260/29.6 RB |
| 4,314,050 A | 2/1982 | Girgis ................... | 528/140 |
| 4,368,299 A | 1/1983 | Watanabe et al. ........ | 525/481 |
| 4,393,189 A | 7/1983 | Girgis ................... | 528/155 |
| 4,461,859 A | 7/1984 | Girgis ................... | 524/62 |
| 4,476,191 A | 10/1984 | Girgis ................... | 428/378 |
| 4,477,619 A | 10/1984 | Lattimer et al. ......... | 524/171 |
| 4,537,931 A | 8/1985 | Gillberg-La Force et al. .................... | 524/510 |
| 4,739,814 A | 4/1988 | Berczi et al. ............ | 152/527 |
| 5,244,725 A | 9/1993 | Dressler et al. .......... | 428/289 |
| 5,246,735 A | 9/1993 | Takata et al. ........... | 427/175 |
| 5,365,988 A | 11/1994 | Soderberg et al. ....... | 152/527 |
| 5,385,979 A | 1/1995 | Ozawa et al. ........... | 525/145 |
| 6,046,262 A | 4/2000 | Li et al. ................. | 524/261 |
| 6,333,281 B1 | 12/2001 | Li et al. ................. | 42/157 |
| 6,347,563 B1 | 2/2002 | Witt ..................... | 524/261 |
| 6,444,322 B1 | 9/2002 | Li et al. ................. | 428/447 |
| 6,472,457 B1 | 10/2002 | Durairaj et al. ......... | 524/424 |
| 6,602,379 B2 | 8/2003 | Li et al. ................. | 156/335 |
| 6,686,301 B2 | 2/2004 | Li et al. ................. | 524/261 |
| 7,252,129 B2 | 8/2007 | Michiels et al. ......... | 152/531 |
| 7,614,436 B2 | 11/2009 | Ternon et al. ........... | 152/526 |
| 2003/0232915 A1 | 12/2003 | Corvasce et al. ........ | 524/502 |
| 2005/0171245 A1 | 8/2005 | Ni et al. ................. | 524/13 |
| 2005/0239936 A1 | 10/2005 | Winkler ................. | 524/323 |
| 2007/0102115 A1 | 5/2007 | Falke .................... | 156/335 |
| 2008/0112876 A1 | 5/2008 | Dailey ................... | 423/445 R |
| 2009/0218026 A1 | 9/2009 | Giannini et al. ......... | 152/547 |
| 2009/0250151 A1 | 10/2009 | Galimberti et al. ...... | 152/451 |
| 2009/0294008 A1 | 12/2009 | Michiels et al. ......... | 152/527 |
| 2009/0294010 A1 | 12/2009 | Michiels et al. ......... | 152/527 |
| 2009/0294025 A1 | 12/2009 | Michiels et al. ......... | 156/117 |

FOREIGN PATENT DOCUMENTS

| | | | |
|---|---|---|---|
| GB | 1504451 | * | 3/1978 |
| JP | 2007-39506 | | 2/2007 |

* cited by examiner

*Primary Examiner* — Ling Choi
*Assistant Examiner* — Hui Chin
(74) *Attorney, Agent, or Firm* — Brenda D. Wentz

(57) ABSTRACT

This invention relates to improved adhesion compositions and textile materials and articles treated therewith. The improved adhesion composition comprises a non-crosslinked resorcinol-formaldehyde and/or resorcinol-furfural condensate (or a phenol-formaldehyde condensate that is soluble in water), a rubber latex, and an aldehyde component such as 2-furfuraldehyde. The composition may be applied to textile substrates and used for improving the adhesion between the treated textile substrates and rubber materials. End-use articles that contain the treated textile-rubber composite include, without limitation, automobile tires, belts, and hoses as well as printing blankets.

16 Claims, 5 Drawing Sheets

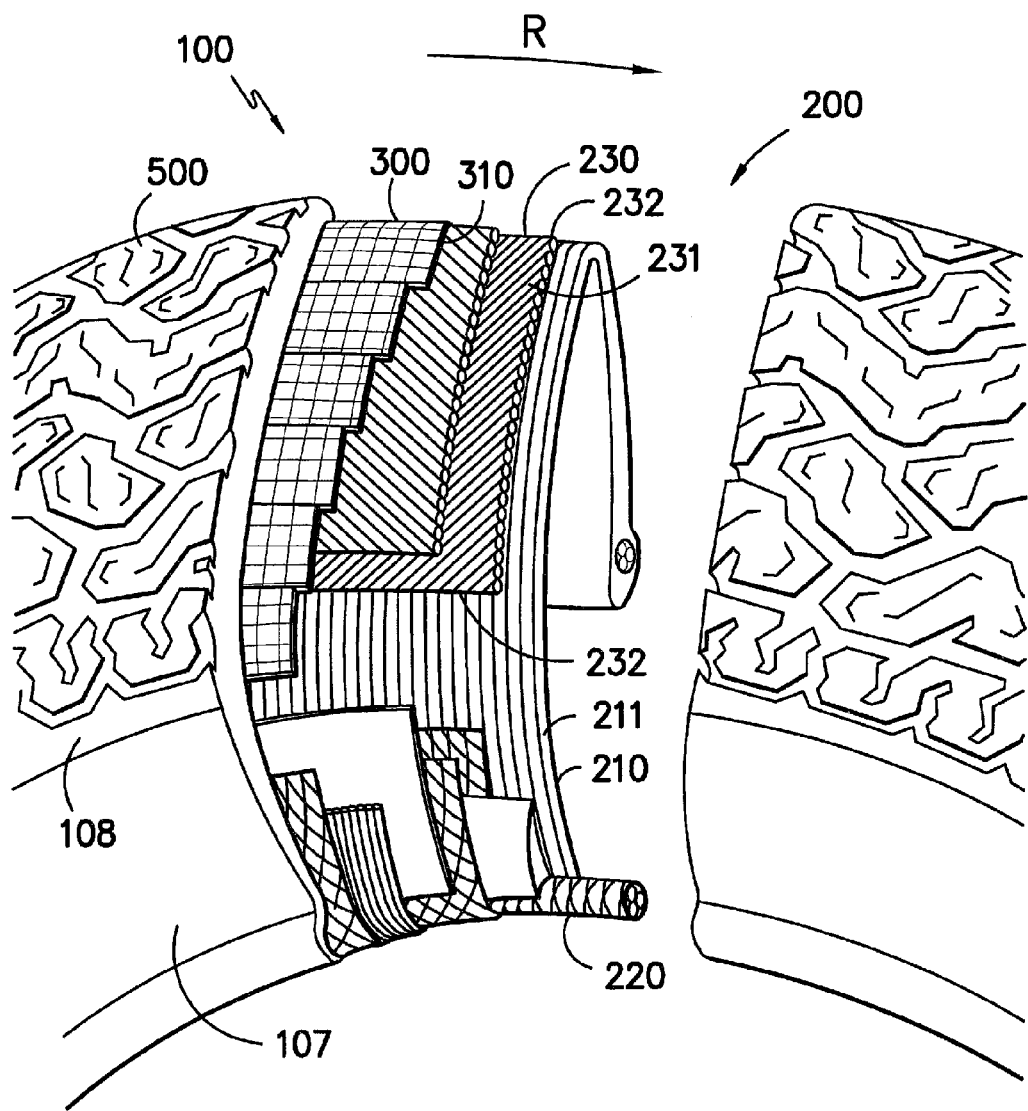
FIG. -1-

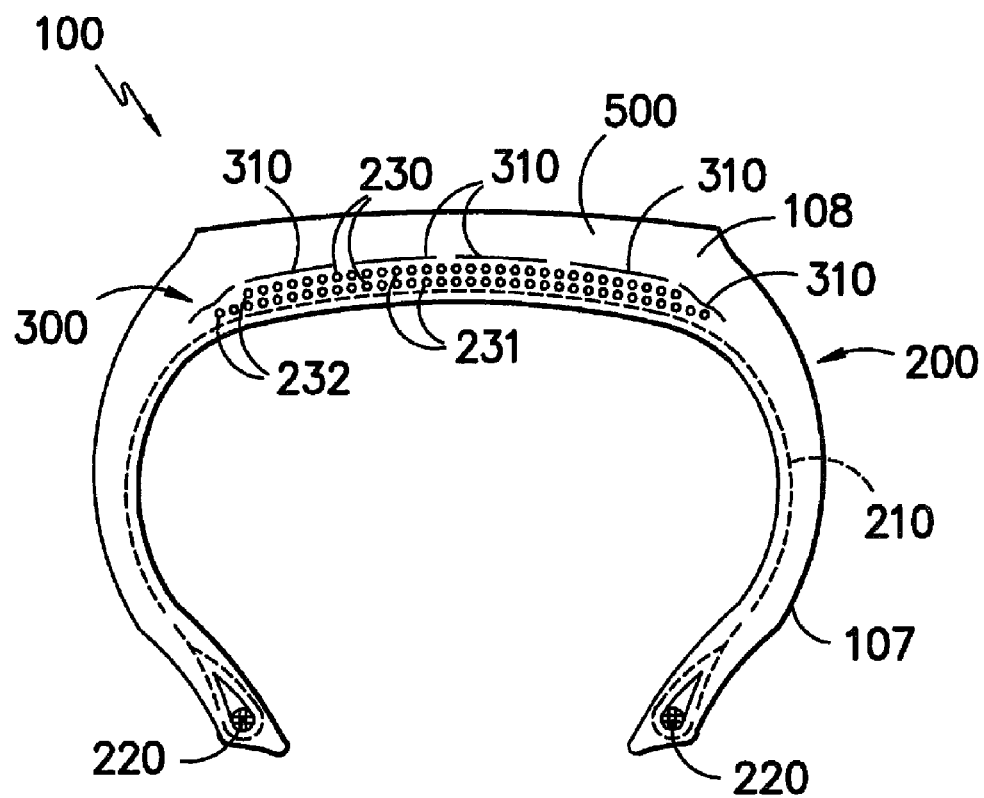
FIG. -2-

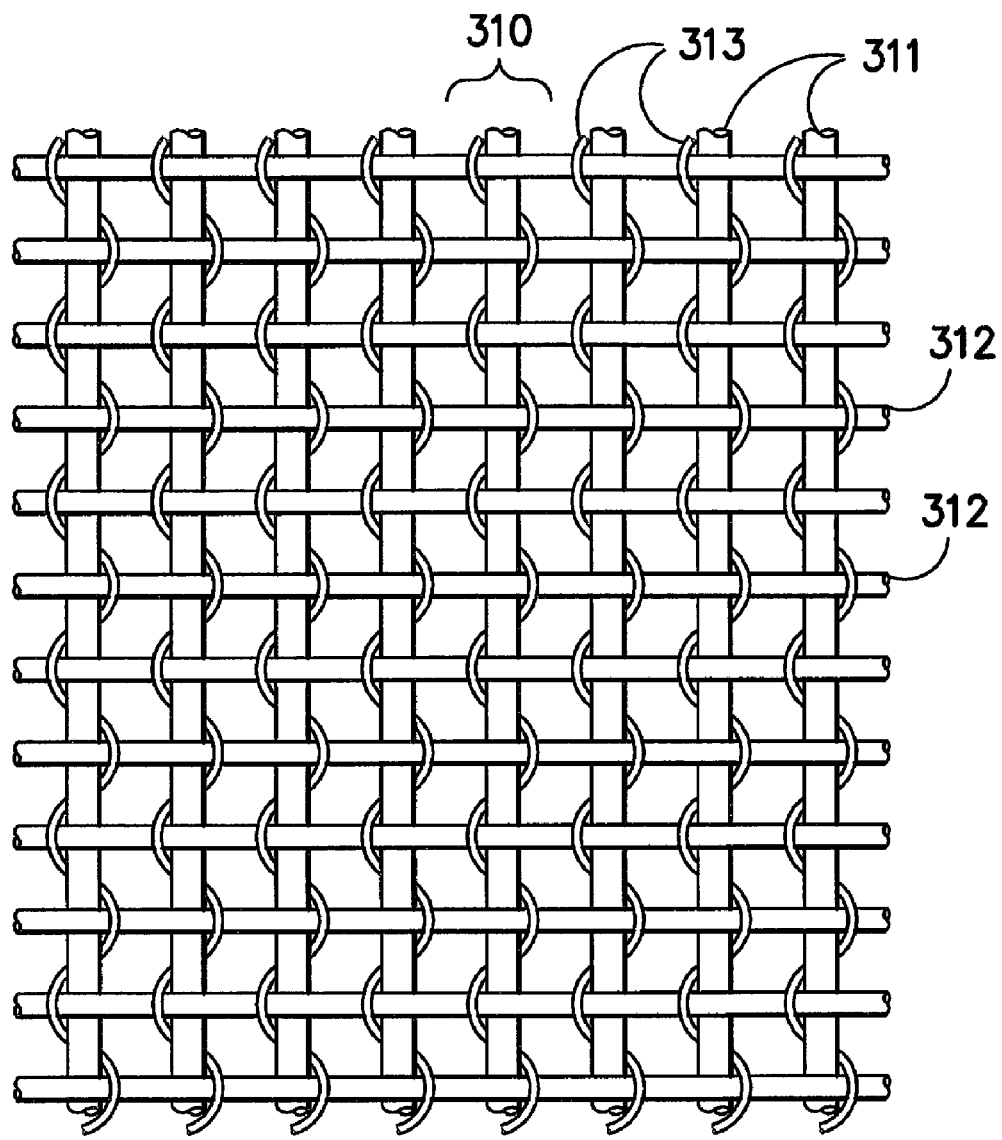
FIG. -3-

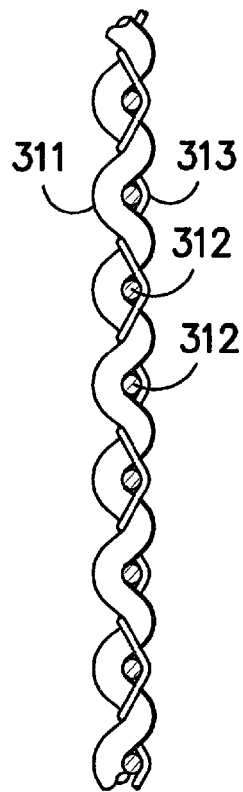
*FIG. -4-*
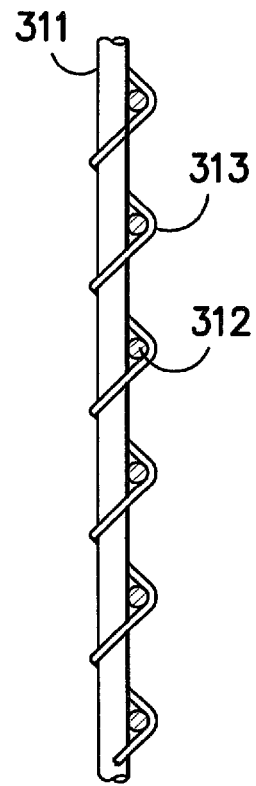
*FIG. -5-*
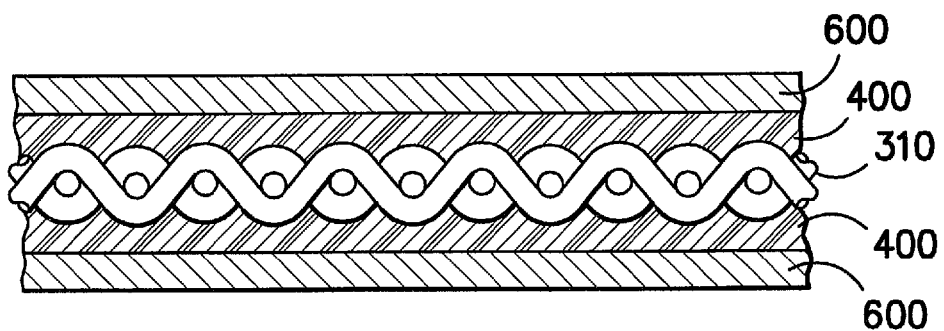
*FIG. -7-*

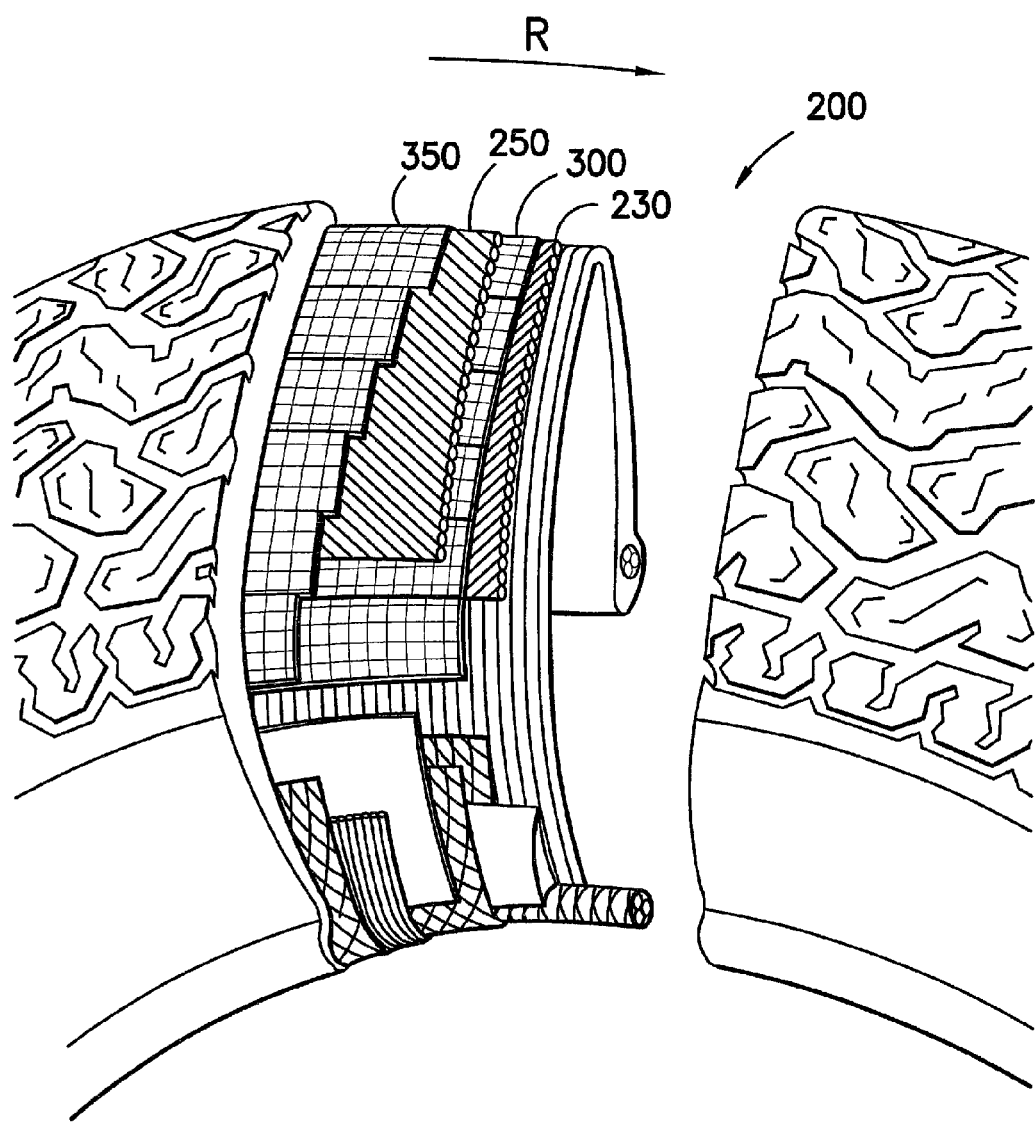
FIG. −6−

ADHESION COMPOSITION AND TEXTILE MATERIALS AND ARTICLES TREATED THEREWITH

FIELD OF THE INVENTION

This invention relates to improved adhesion compositions and textile materials and articles treated therewith. The improved adhesion composition comprises a non-crosslinked resorcinol-formaldehyde and/or resorcinol-furfural condensate (or a phenol-formaldehyde condensate that is soluble in water), a rubber latex, and an aldehyde component such as 2-furfuraldehyde. The composition may be applied to textile substrates and used for improving the adhesion between the treated textile substrates and rubber materials. End-use articles that contain the treated textile-rubber composite include, without limitation, automobile tires, belts, and hoses as well as printing blankets.

BACKGROUND OF THE INVENTION

Resorcinol formaldehyde latex (RFL) compositions have been used to treat textile substrates to enhance the substrates' adhesion to rubber-containing materials for textile reinforced rubber products such as tires, conveyor belts, transmission belts, and other composite materials. The presence of formaldehyde in traditional RFL compositions can present multiple health hazards. For example, since formaldehyde is very volatile (e.g. it is a gas at room temperature), it may be undesirably emitted during the process of use, which, without proper ventilation, could be a potential health risk in inhaled. Also, formaldehyde may be lost in a convection oven during drying at elevated temperature. Therefore, the efficiency of a process that utilizes formaldehyde may not be optimized due to this raw material loss.

Another problem associated with the use of traditional RFL compositions is that textile materials that have been treated with these RFL compositions typically lose their flexibility and are very stiff. Some end-use applications require a certain amount of flexibility in the RFL-treated article in order for the treated article to be use-able. Typical RFL compositions struggle to meet these flexibility requirements.

Furthermore, due to their relatively high reactivity levels, many RFL compositions are unstable at room temperature. Certain lattices cannot be made commercial due to the short shelf life of typical RFL compositions.

Finally, improving the adhesion strength between a textile material and a rubber compound is also desirable for optimized robustness and durability of the resulting textile-rubber composite. In this regard, traditional RFL compositions can still be improved to provide even greater adhesion between textile substrates and rubber. In one aspect, this feature is exemplified in automobile tires wherein the adhesion of fabric to tire rubber is an important safety feature which aids in preventing the tire from deteriorating during use.

Thus, one embodiment of this invention provides a composition comprising 2-furfuraldehyde and/or a reaction product of 2-furfuraldehyde to provide improved adhesion without the problems mentioned above. The 2-furfuraldehyde component has a boiling point of 160° C. (vs. −19° C. of formaldehyde, a gas at room temperature) and is much less likely to volatilize in a drying oven than formaldehyde. The 2-furfuraldehyde component also exhibits a significantly lower toxicity profile than formaldehyde. A textile material treated with the composition of this invention is much softer and more flexible than a traditional RFL-treated textile, and the resulting textile-rubber composite material is also much softer and more flexible. The 2-furfuraldehyde containing composition is also more stable than a formaldehyde-containing composition.

Adhesion of materials to various rubbers and textile materials is improved using the composition of the present invention.

BRIEF SUMMARY OF THE INVENTION

Provided herein is a composition for adhering textile materials and rubber-containing articles comprising: a) a compound selected from the group consisting of a non-crosslinked resorcinol-formaldehyde condensate, a resorcinol-furfural condensate, a phenol-formaldehyde condensate, and mixtures thereof; b) a latex component; and c) an aldehyde component represented by Structure (1), (2) or (3):

wherein X is selected from the group consisting of oxygen, nitrogen and sulfur;

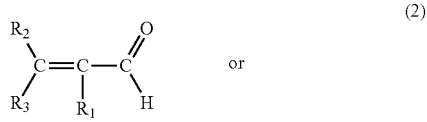

or

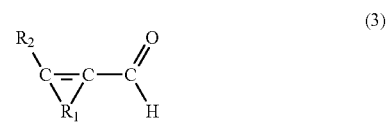

wherein $R_1$, $R_2$ and $R_3$ may be independently selected from the group consisting of alkyl, aryl, halo, hydrogen, and carboxylic functional groups.

Further provided herein is a coated textile material comprising: a) a textile substrate; and b) a composition comprising the reaction product of a mixture comprising: i) a compound selected from the group consisting of a non-crosslinked resorcinol-formaldehyde condensate, a resorcinol-furfural condensate, a phenol-formaldehyde condensate, and mixtures thereof; ii) a latex component; and iii) an aldehyde component represented by Structure (1), (2) or (3):

wherein X is selected from the group consisting of oxygen, nitrogen and sulfur;

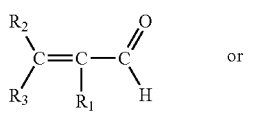 (2)

or

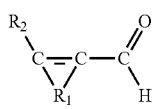 (3)

wherein $R_1$, $R_2$ and $R_3$ may be independently selected from the group consisting of alkyl, aryl, halo, hydrogen, and carboxylic functional groups.

Yet another alternative includes a tire comprising: a) at least one layer of textile material coated with a composition; said composition comprising the reaction product of a mixture comprising: i) a compound selected from the group consisting of a non-crosslinked resorcinol-formaldehyde condensate, a resorcinol-furfural condensate, a phenol-formaldehyde condensate, and mixtures thereof; ii) a latex component; and iii) an aldehyde component represented by Structure (1), (2) or (3):

 (1)

wherein X is selected from the group consisting of oxygen, nitrogen and sulfur;

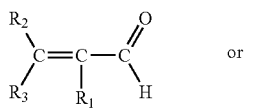 (2)

or

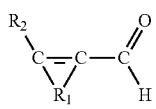 (3)

wherein $R_1$, $R_2$ and $R_3$ may be independently selected from the group consisting of alkyl, aryl, halo, hydrogen, and carboxylic functional groups; and b) at least one layer of vulcanized rubber, wherein the vulcanization of said vulcanized rubber occurred at least partially after inclusion in said tire.

Also provided herein is a cap ply comprising: a) a textile substrate having a composition, said composition comprising the reaction product of a mixture comprising: i) a compound selected from the group consisting of a non-crosslinked resorcinol-formaldehyde condensate, a resorcinol-furfural condensate, a phenol-formaldehyde condensate, and mixtures thereof; ii) a latex component; and iii) an aldehyde component represented by Structure (1), (2) or (3):

 (1)

wherein X is selected from the group consisting of oxygen, nitrogen and sulfur;

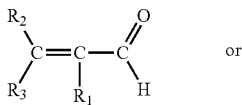 (2)

or

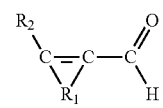 (3)

wherein $R_1$, $R_2$ and $R_3$ may be independently selected from the group consisting of alkyl, aryl, halo, hydrogen, and carboxylic functional groups.

Further provided herein is a tire comprising a cap ply wound over a steel belt ply, wherein the cap ply comprises: a) a textile substrate having a composition, said composition comprising the reaction product of a mixture comprising: i) a compound selected from the group consisting of a non-crosslinked resorcinol-formaldehyde condensate, a resorcinol-furfural condensate, a phenol-formaldehyde condensate, and mixtures thereof; ii) a latex component; and iii) an aldehyde component represented by Structure (1), (2) or (3):

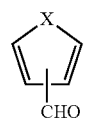 (1)

wherein X is selected from the group consisting of oxygen, nitrogen and sulfur;

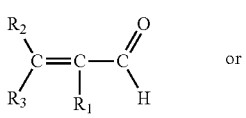 (2)

or

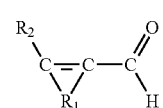 (3)

wherein $R_1$, $R_2$ and $R_3$ may be independently selected from the group consisting of alkyl, aryl, halo, hydrogen, and carboxylic functional groups.

Yet another aspect provided herein is a method for synthesizing an improved adhesion composition comprising the steps of: (a) forming an aqueous mixture comprising (i) a water soluble, phenolic condensate material selected from the group consisting of a non-crosslinked phenolic condensate, a non-crosslinked resorcinol-furfuraldehyde condensate, and a phenol-formaldehyde condensate; (ii) a latex component; (iii) a base component; and (iv) an aldehyde component represented by Structure (1), (2) or (3):

(1)

wherein X is selected from the group consisting of oxygen, nitrogen and sulfur;

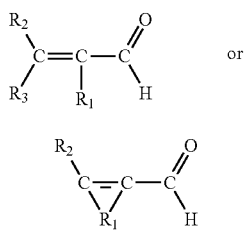

wherein $R_1$, $R_2$ and $R_3$ may be independently selected from the group consisting of alkyl, aryl, halo, hydrogen, and carboxylic functional groups;

wherein the water soluble condensate material contains sufficient resorcinol functional groups or phenol groups to allow for a reaction between the condensate material and the aldehyde component; and (b) allowing the mixture to age at room temperature for at least about 8 to 24 hours.

Further provided herein is a method for synthesizing a resorcinolic resin comprising the steps of: (a) mixing 2-furfuraldehyde with a water soluble, phenolic condensate material selected from the group consisting of a non-crosslinked phenolic condensate, a non-crosslinked resorcinol-furfuraldehyde condensate, and a phenol-formaldehyde condensate; (b) adding a base component to the mixture of step a); (c) adding a latex component to the mixture of step b); and (d) allowing the mixture to age at room temperature for at least about 8 to 24 hours.

Also provided herein is a method for synthesizing a resorcinolic resin comprising the steps of: (a) mixing 2-furfuraldehyde with a water soluble, non-crosslinked resorcinol-formaldehyde condensate material; (b) adding a base component to the mixture of step a); (c) adding a latex component to the mixture of step b); and (d) allowing the mixture to age at room temperature for at least about 8 to 24 hours.

BRIEF DESCRIPTION OF THE DRAWINGS

FIG. 1 is a cutaway partial view of a pneumatic radial tire.

FIG. 2 is a cross-sectional view corresponding to FIG. 1.

FIG. 3 is an enlarged cutaway partial view of a leno tape for use in the tire of FIG. 1.

FIG. 4 is an enlarged cutaway side view of a leno tape before tire construction.

FIG. 5 is an enlarged cutaway side view of a leno tape after tire construction.

FIG. 6 is cutaway partial view of a pneumatic radial tire.

FIG. 7 is an enlarged view of one aspect of the present invention.

DETAILED DESCRIPTION OF THE INVENTION

All U.S. and foreign patents and U.S. patent applications disclosed in this specification are hereby incorporated by reference in their entirety.

Without limiting the scope of the invention, the preferred features and embodiments of the invention are hereinafter set forth. Unless otherwise indicated, all parts, percentages and ratios are by weight. The term "copolymer" is intended to include polymers containing two, three or more types of monomer units. The term "styrene-butadiene rubber" may be represented as "SBR," and "nitrile-butadiene rubber" may be represented as "NBR."

One method of making the furfuraldehyde-containing composition of the present invention includes combining (a) a non-crosslinked phenolic condensate, such as a resorcinol-formaldehyde condensate, a non-crosslinked resorcinol-furfuraldehyde condensate or a phenol-formaldehyde condensate that is soluble in water, (b) a rubber latex, (c) an aldehyde component such as 2-furfuraldehyde, and (d) a small amount of base. The base may be one of sodium hydroxide, potassium hydroxide, ammonium hydroxide, sodium carbonate, and the like, and mixtures thereof. The composition is typically provided in an aqueous solution or mixture, although organic solvents or organic co-solvents may be used instead of or in addition to water. The non-crosslinked resorcinol-formaldehyde resin, non-crosslinked resorcinol-furfuraldehyde condensate or phenolic resin contains an excess amount of resorcinol functional groups or phenol groups to allow reaction with the aldehyde component, such as 2-furfuraldehyde.

After the mixture described above is combined, it is allowed to age at room temperature for at least about 8 to 24 hours. The mixture thus prepared may then be applied to a textile substrate in a pad-and-dry process or any other suitable coating process. The treated textile substrate may then be placed in contact with a green rubber component ("green" is intended to describe a rubber material that has been compounded but not cured). The textile material-rubber composite is then exposed to pressure and elevated temperature for a sufficient amount of time to cure the rubber component. The treatment using the mixture described herein provides improved adhesion between the treated textile material and rubber.

Without being bound by theory, it is believed that, due to the unsaturated diene structure of 2-furfuraldehyde, a Diels-Alder reaction occurs between the diene and the unsaturated vinyl group of the rubber resin, resulting in greater adhesion. For illustrative purposes, two such chemical reaction schemes are provided below:

Reaction I

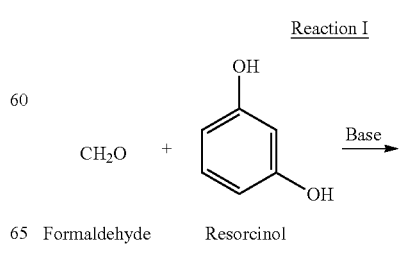

Formaldehyde   Resorcinol

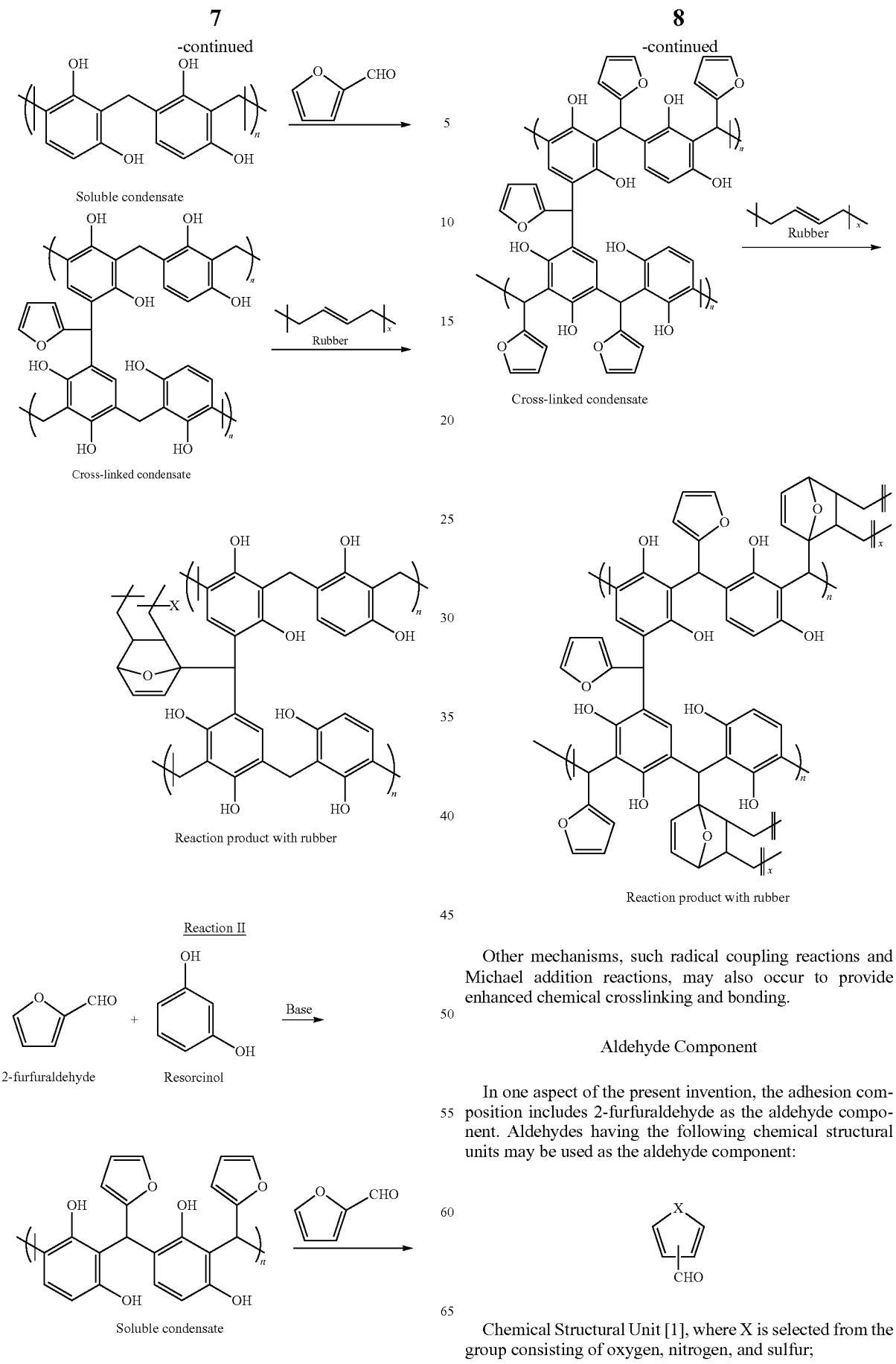

Other mechanisms, such radical coupling reactions and Michael addition reactions, may also occur to provide enhanced chemical crosslinking and bonding.

Aldehyde Component

In one aspect of the present invention, the adhesion composition includes 2-furfuraldehyde as the aldehyde component. Aldehydes having the following chemical structural units may be used as the aldehyde component:

Chemical Structural Unit [1], where X is selected from the group consisting of oxygen, nitrogen, and sulfur;

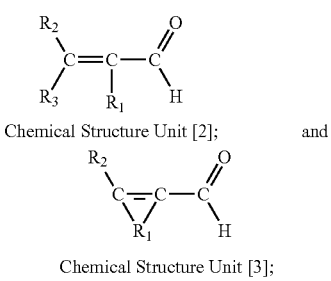

Chemical Structure Unit [2]; and

Chemical Structure Unit [3];

Wherein $R_1$, $R_2$ and $R_3$ are independently selected from the group consisting of alkyl, aryl, halo, hydrogen, carboxylic and other organic functional groups. Exemplary aldehydes may include, but are not limited to, cinnamic aldehyde, crotonaldehyde, α,β-unsaturated aldehydes, benzyl aldehyde, propylaldehyde, butyraldehyde, iso butyl-aldehyde, 2-pyridinecarboxaldehyde, 3-pyridinecarboxaldehyde, 4-pyridinecarboxaldehyde, 2,6-pyridinedicarboxaldehyde, phthalic 1,2-dicarboxaldehyde, phthalic 1,3-dicarboxaldehyde, phthalic 1,4-dicarboxaldehyde, o-sulfo-benzoic aldehyde, and/or the following:

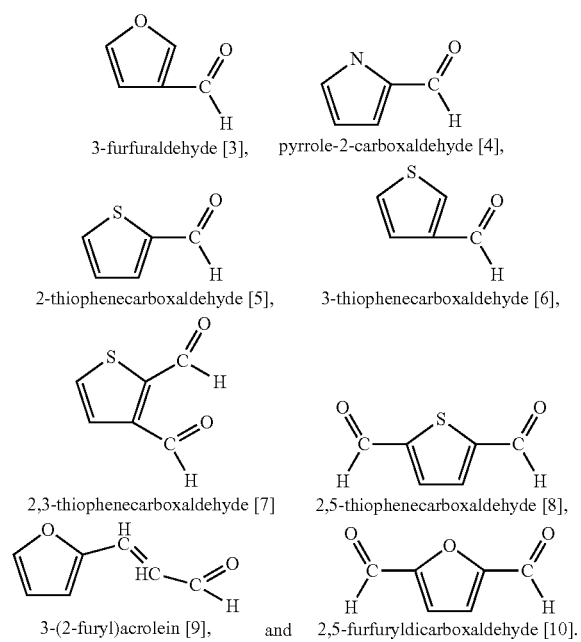

3-furfuraldehyde [3], pyrrole-2-carboxaldehyde [4], 2-thiophenecarboxaldehyde [5], 3-thiophenecarboxaldehyde [6], 2,3-thiophenecarboxaldehyde [7], 2,5-thiophenecarboxaldehyde [8], 3-(2-furyl)acrolein [9], and 2,5-furfuryldicarboxaldehyde [10].

Mixtures of the afore-mentioned aldehydes may also be used together with or without 2-furfuraldehyde. Benzyl aldehyde, for example, has limited solubility in water, and therefore may be incorporated in a water-based formulation in limited amounts. However, the solubility issue may be overcome when benzyl aldehyde is combined with 2-furfuraldehyde in an aqueous formulation.

Phenolic Condensate Component

Generally, any of the aldehyde components described above, combined with formaldehyde, may be reacted with a phenolic compound to produce a phenolic condensate component. The non-crosslinked resorcinol-formaldehyde resin, non-crosslinked resorcinol-furfuraldehyde condensate or phenolic resin may be prepared by reacting 2-furfuraldehyde with resorcinol or a phenol compound with excess amount of resorcinol functional group or phenol group and to stop the reaction before a gel point is reached. The reaction is typically catalyzed with a base, such as sodium hydroxide, and is carried out in an aqueous solution. The reaction may also be carried out in an inert atmosphere (such as under a nitrogen blanket) at elevated temperatures (typically between about 50° C. and 120° C. or between about 60° C. and 90° C.). An inert atmosphere prevents unwanted oxidation of the phenol group in the condensate. Generally, any phenol-containing compounds that are capable of undergoing chemical reactions with an aldehyde may be used to prepare the phenolic condensate.

The molar ratio of resorcinol (or other phenolic components) and an aldehyde may be between about 1:0.5 and about 1:1.1. When formaldehyde is used as the aldehyde component, the ratio may be between about 1:0.5 and about 1:0.8, or between about 1:0.6 and about 1:0.7. When 2-furfuraldehyde is used, the molar ratio of resorcinol to 2-furfuraldehyde may range from between about 1:1.1 and about 1:0.6, between about 1:1 and about 1:0.8, or between about 1:1 and about 1:0.9.

A mixture of two or more aldehydes and/or phenolic monomers may be used to prepare the phenolic condensate. For example, a mixture of formaldehyde and 2-furfuraladehyde may be used to react with resorcinol to form a phenolic condensate. The resulted reaction product is typically a free-flowing viscous liquid. To improve the storage stability of the resulted reaction product, an acid or a buffer may be added to the liquid to neutralize at least part of the base catalyst used in the reaction. The amount of base catalyst may vary depending on the phenolic compound and aldehyde used. The base catalyst typically ranges from 0.1% to about 5% in a reaction mixture. Due to the excess amount of phenol group in the reaction product, the phenolic condensate may react further with an aldehyde component described herein, and may form a crosslinked phenolic condensation polymer. Alternative, the phenolic condensate may be prepared by using excess amount of aldehyde component. The phenolic condensate may be subsequently mixed with a phenolic compound before applied to a textile and then may be dried and cured.

Latex Component

Generally, any type of latex may be used to make the adhesion composition of the present invention. Exemplary latex components may include at least one of an epoxy resin, a functional rubber latex, an unvulcanized rubber latex, and mixtures thereof. Rubber lattices may include, but are not limited to, vinylpyridine rubber latex, styrene-butadiene rubber latex, chloroprene rubber latex, nitrile rubber latex, butyl rubber latex, ethylene propylene diene monomer (EPDM) rubber latex, butadiene rubber latex, polyisoprenes, hydrogenated rubber latex, and any mixtures thereof.

In another aspect, an epoxy resin may be included in the adhesion composition. For example, the epoxy adhesive composition of U.S. Pat. No. 5,565,507 to Marco et al. may be included, wherein the adhesion composition includes an aqueous dispersion of an epoxy resin and a functionalized rubber latex. The epoxy resin has an epoxy functionality of three or greater. A large number of commercially available epoxy resins are available and by way of example and not limitation, include epoxy cresol-novolac resins; epoxy phenol-novolac resins; poly nuclear phenol-glycidyl ether-derived resins, such as the tetraglycidyl ether of tetrakis(4-hydroxyphenyl)ethane; resins containing an aromatic amine backbone, such as triglycidyl p-aminophenol-derived resins and triglycidyl triazine-derived resins such as triglycidyl isocyanurate; and mixtures thereof. In one aspect of the invention, the epoxy resin is a cresol-novolac or phenol-novolac resin.

To further enhance the stability of the adhesion composition, it may be desirable to select epoxy resins having an average particle size of less than 5 microns, or less than 3 microns, and or even about 1 micron or less. Typically, the molecular weight of the cresol-novolac and phenol-novolac epoxy resins range from about 475 to 1750, ore from about 650 to 1500. Also included are trifunctional epoxy resins which have been modified to enhance their dispersability such as by grafting acrylic monomers to the epoxy resin backbone.

In one aspect, the functionalized rubber latex may be generally characterized as a rubber latex comprising a rubber polymer having pendant carboxyl, amide, or pyridyl functionalities, and such functionalities are intended to include derivatives thereof. Also included are rubber lattices which contain combinations of one or more of these functionalities. The functionalized rubber lattices are typically produced by copolymerization of a conjugated diene, and ethylenically unsaturated monomer containing one of the aforementioned functionalities, and optionally, compatible monomers, such as those used in elastomer copolymers.

Suitable dienes include conjugated dienes having from 4 to 9 carbon atoms such as 1,3-butadiene, 2-methyl-1,3-butadiene, 2-ethyl-1,3-butadiene, 2,3-dimethyl-1,3-butadiene and halogen-substituted butadienes, such as 2-chloro-1,3-butadiene.

Compatible comonomers may also be included for copolymerization in the rubber lattices. For example, aromatic vinyl compounds, such as styrene, α-methylstyrene, 2-methylstyrene, 3-methylstyrene, 4-methylstyrene, 2,4-di-isopropylstyrene, 2,4-dimethylstyrene, 4-t-butylstyrene, 5-t-butyl-2-methylstyrene, monochlorostyrene, dichlorostyrene, monofluorostyrene and hydroxymethylstyrene may be employed. Another class of compatible monomers includes cyanated vinyl monomers such as acrylonitrile, methacrylonitrile, fumaronitrile, and maleonitrile. Still another class of compatible monomers includes aliphatic vinyl compounds, such as ethylene, propylene, and vinyl chloride. The amount of the compatible monomer in the rubber latex is generally 55% by weight or less.

Monomers which may be polymerized into the rubber latex to provide a carboxyl functionality may include ethylenically unsaturated carboxylic acids, such as acrylic acid, methacrylic acid, crotonic acid, cinnamic acid, itaconic acid, fumaric acid, maleic acid and butene tricarboxylic acid; monoalkyl esters of ethylenically unsaturated dicarboxylic acids; and ethylenically unsaturated acid anhydrides, which may be hydrolyzed to the corresponding carboxylic acid. The monomer may also include urethane and/or urea functional groups.

The carboxyl functionalized monomer is typically provided in the functionalized rubber latex in a range of 0.1 to 25 wt %, preferably 0.5 to 12 wt %, most preferably 1 to 7 wt %. These compounds, generally referred to as carboxylated rubber lattices, are well known and commercially available, such as Tylac NP-1672®, available from Reichold Chemical Company as a 70% solid carboxylated styrene/butadiene polymer dispersion in water.

Suitable functionalized monomers for providing a pyridyl functionality include vinylpyridines, such as 2-vinylpyridine, 3-vinylpyridine and 4-vinylpyridine as well as alkyl derivatives thereof such as 2-methyl-5-vinylpyridine and 5-ethyl-2-vinylpyridine, 2-methyl-6-vinylpyridine and 2-ethyl-4-vinylpyridine.

The pyridyl functionalized monomer is generally provided in the functionalized rubber latex in the amount of 5 to 45 wt %, preferably 10 to 30 wt %. Vinylpyridine/rubber latex copolymers are commercially available, such as Pliocord LVP-4668™ from Goodyear Chemical Company which is a 40% solids dispersion in water of styrene/butadiene/vinylpyridine in the approximate weight ratio of 45:45:10.

Another class of functionalized monomers includes ethylenically unsaturated compounds having a pendant amide or amide derivative group. Useful monomers include acrylamide and N-methylolacrylamide. These compounds may be employed in free radical, emulsion polymerization with the conjugated diene monomers and optional compatible monomers, such as disclosed in Kirk-Othmer Encyclopedia of Chemical Technology, 3rd Edition, Volume 14, page 82 on "Latex Technology". The amide functionalized monomer may be employed effectively in amounts of from 0.1 to 30 wt % in the functionalized rubber latex.

Also included are functionalized rubber lattices having both pendant carboxyl and pyridyl groups, or derivatives thereof. For example, Hisaki et al., U.S. Pat. No. 5,286,783, discloses a copolymer latex obtained by emulsion polymerization of from 45 to 85% of a conjugated diene monomer, 0.1 to 25% of an ethylenically unsaturated acid monomer, 10 to 45% of a vinylpyridine monomer and up to 30% other comonomers, such as aromatic vinyl compounds.

In another aspect, the functionalized rubber latex may comprise polymer resin having a saturated backbone. Examples of such lattices, include, but are not limited to, polyurethanes, acrylics, polyolefins, polyethylene, and polypropylene. The polymer resin may further include functional carboxylic, sulfonyl, oxyethylene, oxypropylene, hydroxyl, amide, and/or other functional groups. In yet another aspect, various combinations of different functionalized rubber lattices may be used to form the adhesion composition herein.

The relative concentration of the epoxy resin and functionalized rubber latex in the adhesion composition may be in the range from 1:15 to 4:1, preferably in the range from 1:4 to 1:1. In an alternate embodiment, the adhesion composition contains an epoxy resin and both a carboxylated rubber latex and a pyridyl functionalized rubber latex. Optimum adhesion between a reinforcing textile and rubber product may be achieved when the adhesion composition contains the following relative concentration of components: from 7-60 wt % epoxy resin, from 5-65 wt % carboxylated rubber latex, and from 15-75 wt % pyridyl functionalized rubber latex; preferably, from 15-50 wt % epoxy resin, from 10-50 wt % carboxylated rubber latex, and from 20-65 wt % pyridyl functionalized rubber latex; or, from 25-40 wt % epoxy resin, from 15-30 wt % carboxylated rubber latex, and from 35-55 wt % pyridyl functionalized rubber latex.

Unvulcanized rubber materials may further be incorporated in the adhesion composition. Unvulcanized rubber includes any polymeric material having unsaturated carbon-carbon bonds that are capable of crosslinking with each other. Exemplary unvulcanized rubbers includes polybutadiene, polyisoprene, synthetic trans-rich polyisoprene or cis-rich polyisoprene, natural rubber, poly(styrene-co-butadiene), poly(acrylonitrile-co-butadiene), chloroprene, hydrogenated SBR, hydrogenated NBR, butyl rubber (polyisobutylene copolymers), halo-butyl rubber, EPDM rubber, and mixtures thereof. The rubber may be in the form of a latex, emulsion or solvent solution before combined with other components and subsequently applied to a textile material. The unvulcanized rubber, after being applied to a textile material, can be further vulcanized (crosslinked) in the presence of a curing agent or by virtue of being in contact with another rubber compound comprising a curing agent. The curing agent may be a sulfur based curing agent, organic peroxide, and other chemical agent that can cause effective crosslinking (curing) of the rubber material. In one aspect, natural rubber (particularly natural rubber latex), and mixtures comprising natural rubber latex and polybutadiene may be utilized.

The adhesion composition is generally aqueous with a solids content of from 2 to 60 wt %, or from 7 to 40 wt %. In addition to the epoxy resin and functionalized rubber latex or lattices, the adhesion composition may contain minor amounts of additional additives. For example, the aqueous portion of the adhesion composition may contain minor amounts of hydrophilic solvents, such as methanol. Various antioxidants, antiozonants, wetting agents, rheology modifiers, and pH buffers may also be included in the adhesion composition.

The aqueous adhesion composition may be applied to a textile to give an add-on of from 1 to 30 wt % solids based on a weight of the untreated textile, preferably 5 to 15 wt % solids. Any of a number of techniques, as are well known in the art, can be employed, such as dipping, spraying, or application from a kiss roll. In one aspect, a woven fabric is dip-coated by immersion in the aqueous adhesion composition at ambient conditions.

Additionally, the curing step between the treated textile substrate and the rubber compound is performed in any conventional manner, such as through heat-activated vulcanization in the presence of a curing agent (such as organic peroxide). Again, such a step should be well within the purview of the ordinarily skilled artisan in this field. Non-limiting examples of application methods which may be useful are provided in U.S. patent application Ser. No. 12/661,170, "Pattern Coated Cap Ply For Tire Construction," to Michiels et al., filed Mar. 11, 2010; U.S. Pat. Nos. 6,602,379 to Li et al.; 6,046,262 to Li et al.; 6,333,281 to Li et al.; 6,444,322 to Li et al.; 6,686,301 to Li et al.; 6,346,563 to Li et al.; all of which are entirely incorporated by reference herein.

Optional Additives

One or more optional additives may be included in the adhesion composition of the present invention. In one embodiment, the adhesion composition may include a tacky resin. The tacky resin may be selected from the group consisting of phenol-containing resins (such as phenol formaldehyde resin, resorcinol formaldehyde condensate, condensate of phenol derivatives with aldehydes and acetylene, terpene phenolic resins), aromatic resins, hydrocarbon resins, terpene resins, indene resins, coumarone resins, rosin-based resins, and mixtures thereof. The tacky resin may be included at 2%-50%, 2%-30%, 5%-20%, or 8%-20% by weight based on the total dry weight of the adhesion composition. For example, a hydrocarbon tacky resin, a rosin ester resin or mixture thereof may be further included in the adhesion composition at about 10%-18% based on the total dry weight of the formulation. Suitable tacky resins are also described in U.S. Provisional Patent Application Ser. No. 61/354,853 to Michiels et al., filed on Jun. 15, 2010, which is entirely incorporated by reference herein.

Optional additives may also include stabilizers (such as diphenylamine-based stabilizers; heat stabilizers such as mica and quartz), antioxidants (such as phenolic-based antioxidants, such as hindered phenolic antioxidants or hindered phenolic antioxidants with thio synergist; and hydroquinoline compounds), electrical discharge dissipaters, ozone and ultraviolet stabilizers (such as Hydrowax Q—solid saturated hydrocarbons), wetting agents, emulsifiers, additional adhesion promoters, antiozonants, rheology modifiers, pH buffers and mixtures thereof. Antioxidants may include hindered phenol compounds, acylphenylenediamine compounds, diphenylamine compounds, mercaptan compounds, thioester compounds, thioether compounds, hydroquinoline compounds, and mixtures thereof. Adhesion promoters may include blocked isocyanate-containing compounds, unblocked isocyanate-containing compounds, epoxy-containing compounds, hexamethoxymethyl melamine ("HMMM") resins, and mixtures thereof. Carbon black and/or silica may also be included as optional additives in the adhesion composition.

Textile Material

Textile materials, such as fabrics, may be treated with the adhesion composition of the present invention. The textile materials may be characterized as having a woven (e.g. leno weave or laid scrim), nonwoven, or knit (e.g. warp knit, weft inserted warp knit, or raschel knit) construction. Fiber types comprising the textile material include synthetic fibers, natural fibers, and mixtures thereof. Synthetic fibers include, for example, polyester, acrylic, polyamide, polyolefin, polyaramid, polyurethane, regenerated cellulose (i.e., rayon), and blends thereof. The term "polyamide" is intended to describe any long-chain polymer having recurring amide groups as an integral part of the polymer chain. Examples of polyamides include nylon 6; nylon 6, 6; nylon 1, 1; and nylon 6, 10. The term "polyester" is intended to describe any long-chain polymer having recurring ester groups. Examples of polyesters include aromatic polyesters, such as polyethylene terephthalate (PET), polybutylene terephthalate (PBT), polytrimethylene terephthalate (PTT), and polytriphenylene terephthalate, and aliphatic polyesters, such as polylactic acid (PLA). "Polyolefin" includes, for example, polypropylene, polyethylene, and combinations thereof. "Polyaramid" includes, for example, poly-p-phenyleneteraphthalamid (i.e., Kevlar®), poly-m-phenyleneteraphthalamid (i.e., Nomex®), and combinations thereof. Natural fibers include, for example, wool, cotton, flax, and blends thereof. Additionally, fibers having various cross-sectional shapes, such as ribbon, multilobal, triangular, core-sheath, split-pie, and the like, and combinations thereof may be utilized herein to form the textile material.

The textile material may be formed from fibers or yarns of any size, including microdenier fibers and yarns (fibers or yarns having less than one denier per filament). The fibers or yarns may have deniers that range from less than about 1 denier per filament to about 2000 denier per filament or more preferably, from less than about 1 denier per filament to about 500 denier per filament, or even more preferably, from less than about 1 denier per filament to about 300 denier per filament.

Furthermore, the textile material may be partially or wholly comprised of multi-component or bi-component fibers or yarns, which may be splittable, or which have been partially or fully split, along their length by chemical or mechanical action. The textile material may be comprised of fibers such as staple fiber, filament fiber, spun fiber, or combinations thereof.

Method for Applying the Adhesion Composition to a Textile Material

The adhesion composition may be applied to a textile material through any technique known in the art for applying a chemical mixture to a substrate. For example, the adhesion composition may be applied to the textile material via spraying, dipping, padding, foaming, printing, coating, and the like. The use of engraved rollers, a three roller system, a rotary screen, and/or a double-sided vertical system may be employed in the application process. One exemplary acceptable method of applying the adhesion composition to a textile material includes padding the composition from a bath mixture, which generally results in coating both surfaces of the textile material in one step. By using one or more of these application techniques, the adhesion composition may be applied to only one surface of a textile material, or it may be applied to both surfaces. The adhesion composition may be applied in a uniform or in a non-uniform manner to at least one surface of the textile material.

Rubber Composites

A rubber composite that is reinforced with a textile treated with the adhesion composition of the present invention may be produced by combining a rubber compound, preferentially an uncured rubber formulated with curatives and other desired additives, with the treated textile. For example, the treated textile may be laminated to a fully compounded green rubber sheet under heat and pressure sufficient to vulcanize the rubber. The resulting rubber composite may be used as belt materials such as printer's blanket, reinforcing yarns used in rubber hoses, reinforced rubber conveyor belts, V-belts, and automotive transmission belts. The treated textile may also be used as a reinforcing tire cord, cap ply, tire body ply, bead wrap, gum strip, and/or chafer fabric to make an automotive tire.

Referring now to the Figures and in particular to FIGS. 1 and 2, there is shown a tire 100, comprising side walls 107 joined to a tread 500 by shoulders 108. The tire 100 includes a carcass 200 covered by the tread 500. In FIGS. 1 and 2, the tire 100 is a radial tire. However, the present invention is not limited to radial tires and can also be used with other tire constructions. The carcass 200 is formed from one or more plies of tire cord 210 terminating at the inner periphery of the tire in metal beads 220, with at least one belt ply 230 located circumferentially around the tire cord 210 in the area of the tread 500. The tire cord 210 is a rubberized woven fabric having its warps formed from relatively inextensible reinforcing cords 211.

In the tire shown in FIG. 1, the carcass 200 is constructed so that the reinforcing cords 211 are running substantially radially of the intended direction of rotation R of the tire 100. The reinforcing cord may comprise the textile material described herein. In one embodiment, the reinforcing cord may comprise an adhesion promotion composition and a tacky finish, as further described herein. The tacky finish may be applied over the adhesion promotion composition. Alternatively, the tacky finish composition and the adhesion promotion composition may be combined and applied to the cord fabric. In another embodiment, the reinforcing cord includes a tacky finish, as described herein. A calendered rubber layer is not required to be included with the reinforcing cord before being incorporated into a tire.

With respect to general construction of pneumatic tires, and in particular to the construction of ply tires with a fiber-reinforced carcass, the fiber-reinforced carcass may include one or more plies of carcass reinforcement fabric having a warp or machine direction and a weft or cross-machine direction. Substantially inextensible reinforcing cords may extend in the cross-machine direction. The carcass reinforcement fabric is typically of one-piece construction with the machine direction of the fabric disposed in substantial alignment with the rotation of the tire and with the reinforcing cords disposed in a radial pattern transverse to the rotation of the tire.

Referring back to FIGS. 1 and 2, the belt plies 230 are formed with relatively inextensible warp materials 231, such as steel cord reinforcing warps, which run in the intended direction of rotation R of the tire or, more usually, at a slight angle thereto. The angle of the inextensible warp materials 231 can vary with the method of construction or application. The belt plies 230 extend across the width of the tread 500 of the tire terminating in edges 232 in the area of the shoulder 108 of the tire 100, i.e. the area where the tread 500 meets the side wall 107.

The cap ply layer 300 is located between the belt plies 230 and the tread 500. The cap ply layer 300 may be formed from a leno tape 310 which is wound circumferentially around the carcass 200 of the tire 100 in a flat helical pattern, resulting in a leno cap ply layer. Alternatively, the cap ply layer may be constructed of knit cap ply or any other fiber and/or fabric construction that is suitable for use in tire manufacturing.

While the following description relates to leno weave fabric construction, it should be recognized that other fabric constructions, for example, knit fabric constructions, may also be suitable for use with the adhesion composition of the present invention in a similar manner.

In one embodiment, the leno tape 310 is wound more frequently at the edges of the tire than the middle of the tire. As illustrated in FIG. 3, the leno tape 310 includes a pair of warp yarns, the first warp yarn 311 and the second warp yarn 313, and weft yarns 312. The leno weave is a weave such that the warp yarns (311, 313) of the warp yarn pairs are arranged with one warp yarn twisted around the other warp yarn between picks of the weft yarn 312. The leno weave gives the leno tape 310 firmness and strength to an open-weave fabric and prevents slippage and displacement of the warp and weft yarns. The first and second warp yarns 311, 313 extend longitudinally along the leno tape 310, which also warp around the carcass 200 due to the wrapping of the leno tape 310 around the carcass 200. It is the first and second warp yarns 311 and 313 that provide most of the reinforcement of the leno cap ply layer 300.

The first warp yarn 311 and the second warp yarn 313 are made of different materials such that the second warp yarn 313 has a force of elongation of between about 1% and 40% of the force of elongation of the first warp yarn 311, the second warp yarn has an elongation at break of greater than 2% and is in tension. Force of elongation is the force needed to elongate the yarn by a fixed amount, or the slope of the stress-strain curve. In a preferred embodiment, the second warp yarn 313 has a force of elongation of between about 1.5% and 20% of the first warp yarn 311 force of elongation. Once woven, the two warp yarns have different amounts of crimp, the second warp yarn has less crimp than the first warp yarn. As can be seen in FIG. 4, when woven the second warp yarn 313 has much less crimp than the first warp yarn 311. One way of accomplishing this is to weave the two warp yarns at different tensions with the second warp yarn at a much higher tension than the first warp yarn 311. This may be accomplished, for example, by using a two-beam leno weave machine. Other ways include, but are not limited to changing the tension on the warp yarns and cap ply layer during dipping, resin treatment, and heat setting. When the leno tape is subsequently subjected to a tensile force, the second warp yarn 313 elongates until the crimp is removed and first yarn 311 is as shown in FIG. 5 in the leno tape 310.

During manufacture of the tire, the leno tape 310 is wound around the carcass. A small amount of elongation is necessary for various processes in the manufacture of the tire, such as so that the cap ply wrapped carcass may be removed from the mandrel where it was wound. The elongation properties of the leno tape 310 accommodate the minor amount of stretching needed for the tire manufacturing process. Preferably, this elongation is about 2%. After the wrapped carcass is taken off the mandrel the leno tape 310 is stretched such that the first warp yarn 311 is straightened and a side view of the fabric resembles FIG. 5. The increase in force per percent elongation after the transition location is needed to form a structurally sound pneumatic tire.

The first warp yarn 311 is selected such that the yarn provides the desired strength of the leno cap ply layer 300 to prevent the belt ply 230 from moving outward in the tire 100 and to protect the rubber in the tire 100 from sharp portions of the belt plies 230. The first warp yarns 311 can be multifilament yarns and are formed of a material which will restrain the belt plies 230. The first warp yarns, in one aspect, have a modulus of between about 25 and 153 GPa, or about 50 to 110 GPa. Yarns with lower modulus might for desired for strength, but may not be desired in some applications because of their large profile. In one aspect, the first warp yarn 311 comprises aramid. In another aspect, the first warp yarn has between about 80 and 300 twists per meter, or about 100 to 250 twists per meter. Varying the twists per meter can affect the force per elongation.

In one embodiment, the first warp yarns 311 may be hybrid yarns. These hybrid yarns are made up of at least 2 fibers of different fiber material (for example, cotton and nylon). These different fiber materials can produce hybrid yarns with different chemical and physical properties. Hybrid yarns are able to change the physical properties of the final product they are used in. In one aspect, hybrid yarns include an aramid fiber with a nylon fiber, an aramid fiber with a rayon fiber, and an aramid fiber with a polyester fiber. In another aspect, the hybrid first yarn 311 being aramid combined with nylon, rayon, or polyester is paired with a thinner second yarn 313 of a lower modulus yarn such as nylon or polyester. The properties of the hybrid first yarns 311 have the same as the yarns forming them, but the combination of the two types of yarns gives a specific force elongation curve. For the hybrid first yarns 311, the higher the amount of twist in the yarn, the flatter the elongation curve.

The second warp yarn 313 provides a crimp in the first warp yarn 311 of the leno tape 310 for manufacturability (with the crimp essentially becoming zero once the cap ply wrapped carcass is removed from the mandrel). The second warp yarn 313 in one embodiment has a modulus of between 5 and 10 GPa. In one aspect, the second warp yarn is a nylon (including nylon 6, nylon 6,6, nylon 4,6, nylon 4,10). The second warp yarn 313 has between about 80 and 300 twists per meter, or about 100 to 250 twists per meter.

In one embodiment, the second warp yarns 313 may be hybrid yarns. These hybrid yarns are made up of at least 2 fibers of different fiber material (for example, cotton and nylon). These different fiber materials can produce hybrid yarns with different chemical and physical properties. Hybrid yarns are able to change the physical properties of the final product they are used in. Some preferred hybrid yarns include an aramid fiber with a nylon fiber, an aramid fiber with a rayon fiber, and an aramid fiber with a polyester fiber.

The weft yarns 312 hold the warp yarns 311 and 313 in the desired spaced apart relationship. The weft yarn 312 can be a spun staple yarn, a multifilament yarn, and/or a monofilament yarn. Preferred examples of suitable materials for the weft yarns 312 include cotton, rayon, polyester, polyamide, aramids (including meta and para forms), nylon, polyvinyl acetate, polyvinyl alcohol, nylon (including nylon 6, nylon 6,6, and nylon 4,6), PBO, and PEN.

The leno tape 310 is constructed with a width preferably of about 5 to 25 millimeters. In one aspect, the leno tape 310 is constructed with a width of about 7 to 15 millimeters. It is important to form a uniform flat layer of the leno tape 310 across the surface of the carcass 200 of the tire 100. The width of the leno tape 310 affects this property. If the leno tape 310 is used in a helical wrapping process, wider strips will cause buckles on the leading edge of the wrap due to excessive width of the materials. Shorter widths provide difficulties in manufacturing the tire 100 due to an excessive number of revolutions necessary in the wrapping procedure to achieve the desired coverage of the carcass 200 with the leno tape 310.

The leno tape 310 is an open construction fabric which permits the strike through of the rubber in the tire 100 for a better bonded construction. The openness of the fabric used for the leno tape 310 is usually determined by the spacing and character of the first and second warp yarns 311 and 313. The weft yarns 312 are typically spaced as necessary to maintain the position of the warp yarns 311 and 313. In one aspect, the fabric has 40-75 warp pairs per decimeter and 10 to 30 weft pairs per decimeter, the first warp yarns are 1100/2 dtex aramid, the second warp yarns are 470/1 dtex nylon, and the weft yarns are 1220/1 dtex rayon. In yet another aspect, the openings formed by the warp yarns and weft yarns are such that the openings will be within about ±5% of the mean opening size.

In another embodiment where the fabric is a 54 warp/22 weft per decimeter fabric with the same materials as described above, the pairs of warp yarns 311, 313 are spaced about 0.95 millimeters apart and the weft yarns 312 are spaced about 3.66 millimeters apart to provide a mean opening size of 3.48 mm$^2$. In yet another embodiment where the fabric is a 20 warp/10 weft per decimeter fabric with the same materials for the yarns, the pairs of warp yarns 311 and 313 are spaced about 4.31 millimeters apart and the weft yarns 312 are spaced about 9.94 millimeters apart to provide a mean opening size of 42.84 mm$^2$. In yet another embodiment where the fabric is a 75 warp/30 weft per decimeter fabric with the same materials for the yarns, the pairs of warp yarns 311 and 313 are spaced about 0.43 millimeters apart and the weft yarns 312 are spaced about 2.36 millimeters apart to provide a mean opening size of 1.01 mm$^2$.

If the leno tape 310 is used in a flat helical pattern, the pattern typically will need more than three full revolutions of the leno tape 310 around the carcass 200 of the tire 100. The length of leno tape 310 will depend on the diameter of the tire 100, the width of the leno tape 310, and the amount of coverage provided by the leno tape 310. The approximate minimum length of a leno tape 310 in a leno cap ply layer 300, with only one layer of leno tape 310 and no gaps or over lapping regions, can be calculated according to the following formula:

$$length = 2rw/t$$

where is 3.14, r is the radius of the tire, w is the width of the area of the tire to be covered, and t is the width of the tape. As an example, for a 185/60/R14 tire, the length of a 13 millimeter wide leno tape 310 would be a minimum of about 15 linear meters in length, and can have an additional amount of about 2-3 meters for overlapping itself in the shoulder area.

Greater strength can be built into the leno tape 310 by constructing the leno tape 310 such that the first and second warp yarns 311 and 313 of the outermost warp yarn pairs in the leno tape 310, run longitudinally for the length of the leno tape 310 as continuous uncut yarns. Even greater strength can be built into the leno tape 310 by constructing the leno tape 310 with all of the first and second warp yarns 311 and 313 run longitudinally the length of the leno tape 310 as continuous uncut yarns.

The leno tape 310 can preferably be treated with an adhesion promotion composition. The adhesion promotion composition may be selected from the group consisting of resorcinol formaldehyde latex (RFL), isocyanate based material, epoxy based material, phenolic resins, materials based on melamine formaldehyde resin, and the adhesion composition of the present invention wherein the aldehyde component is selected from Chemical Structural Unit 1, 2 or 3 as previously described herein.

In one aspect, the leno tape 310 is located edge to edge as it is laid on the carcass 200 of the tire 100, and is wrapped around the entire belt ply 230 area of the tire 100. In yet another aspect, the leno tape 100 is wrapped around the carcass 200 of the tire 100 such that the leno cap ply layer 300 extends beyond the edges 232 of the belt plies 230, under the shoulder 108 area of the tire 100. Overlapping the edge 232 of the belt 230 with the leno tape 310 provides support to the edges 232 of the belt 230 where excessive temperature can build up.

Additionally, the leno cap ply layer 300 can comprises multiple layers, e.g. two, three, or even more layers, of the leno tape 310 that are wound over the ply layer 230 of the carcass 200 to provide extra strength. In one embodiment, the leno tape 310 is laid into a double layer in the shoulder 108 area of the tire 100, providing additional strength at the edges 232 of the belt 230. In another embodiment, the leno cap ply layer 300 can have two layers of leno tape 310 securing the belt ply 230 across the width of the tire 100. When more than one layer of leno tape 310 is used for the cap ply 300, a layer of unvulcanized rubber is placed between the layers of leno tape 310 to insure a good bond. Also, in an embodiment where multiple layers of the leno tape 310 are used, the layers of leno tape 310 can be staggered so that upper strips of leno tape 310 cover the edges of the leno tape 310 in the lower layer.

The leno cap ply layer 300 may be used with one belt ply, two belt plies (as illustrated in FIGS. 1 and 2), or more than two belt plies below the leno cap ply layer 300. In an alternate embodiment illustrated in FIG. 6, the tire 100 can have multiple belt plies 230 and 250 with leno cap ply layers 300 and 350, disposed over each belt ply layer creating alternating layers of belt plies and cap plies. In the alternate embodiment, the leno cap ply layer 300 can also overlap the edge of the underlying belt ply, and/or have multiple layers of leno tape 310 (which can also be staggered so that upper strips overlap edges on lower strips).

The formation of the leno tape 310 begins with the acquisition of the basic yarns for the fabric. Subsequently, the yarns are twisted to provide additional mechanical resilience. After the twisting, first warp yarns 311 and the second warp yarns 313 are placed on a two beams for the formation of the fabric. The fabric is formed by leno weaving with the appropriate spacing of the warp yarn pair weaving with the second warp yarns 313 usually in much higher tension than the first warp yarns 311. The fabric is formed in large widths, such as 61.4 inches. After the fabric formation, the fabric may be finished with one or more compositions. The fabric may be treated with an adhesion promotion composition 400. The fabric may be finished with tacky finish 600. Tacky finish 600 may be applied to the fabric before the fabric slitting process, or it may be applied to the leno tape 310 (after the fabric has been slit into tape). The fabric may be treated with an adhesion promotion composition 400 and subsequently with the tacky finish 600.

The final fabric is slit into the specific leno tape 310 widths for placement on a spool. Cross-winding the leno tape 310 across a cardboard tube provides a convenient package for subsequent removal of the leno tape 310 in the manufacturing process of tire 100.

In the tire formation process, the tire carcass 200 is formed with the tire cord 210, metal beads 220, and belt plies 230. After the tire carcass 200 is formed, the leno tape 310 is wound from the package around the belt plies 230 to form the leno cap ply layer 300. After the leno cap ply layer 300 is placed on the tire carcass 200, the wrapped carcass is removed and the leno cap ply layer is stretched approximately 2% making the first warp yarns 311 have essentially no crimp. The tread 500 is then molded onto the subassembly, and the tire 100 is completed.

Because of the flat helical pattern of the leno tape, there is no overlap area that extends across the width of the tire. Also, the leno tape is wrapped around the circumference of the tire many times, providing a stronger reinforcement to the belt ply. Furthermore, leno weave of the tape secures the warp yarns to the weft yarns, providing a greater resistance to the separation of the warp yarns.

In the present invention, and as illustrated in FIG. 7, adhesion promotion composition 400 may be applied to at least one surface, and in some embodiments, to both surfaces of leno tape 310 to form an adhesion promotion composition-leno tape composite. Following application of the adhesion promotion composition 400 to leno tape 310, the tacky finish 600 may be applied to at least one surface of the adhesion promotion composition—leno tape composite. Thus, adhesion promotion composition 400 and tacky finish 600 may be independently applied to at least one surface of the leno tape 310 (or to the fabric that forms the leno tape 310, prior to being slit into tape), in order to help adhere leno tape 310 to the tread layer 500 and/or the belt ply layer 230.

End-use products comprising a coated textile material as described herein include, without limitation, a printer's blanket, reinforcing yarns or fabrics used in rubber hoses, reinforcing belting fabrics, V-belts, automotive transmission belts, reinforcing tire cord, tire cap ply, tire body ply, tire bead wrap, tire gum strip, and/or chafer fabrics.

EXAMPLES

The invention may be further understood by reference to the following examples which are not to be construed as limiting the scope of the present invention.

The following formulations were applied to Fabric A, Fabric B, or Fabric C, as indicated.

Fabric A was a woven fabric comprised of 100% spun polyester filling yarn and 100% cotton warp yarn. Formulations applied to Fabric A were applied via knife coating and were dried in a convection oven at 150° C. for 3 minutes.

Fabric B was a woven fabric comprised of 100% filament polyester fiber. Formulations applied to Fabric B were applied via padding at a nip pressure of about 40 Psi and were dried in a convention over at 350° F. for about 3 minutes.

Fabric C was a cap ply fabric comprised of a knitted fabric with filament nylon 6,6 warp yarn, rayon weft yarn and a polyester tie yarn. Additional details of tire construction and/or cap ply layers are provided in US Patent Application Publication No. 2009/0294008 to Michiels et al., "Leno Cap Ply For Pneumatic Tire," filed May 29, 2008; US Patent Application Publication Nos. 2009/0294010 and 2009/0294025, both to Michiels et al., "Leno Cap Ply For Pneumatic Tire," filed May 5, 2009; U.S. Pat. No. 4,739,814 to Berczi et al., 5,365, 988 to Soderberg et al.; U.S. Pat. No. 7,252,129 to Michiels et al.; U.S. Pat. No. 7,614,436 to Ternon et al.; all of which are entirely incorporated by reference herein.

For each of the Examples tested for adhesion, a green (uncured) rubber sheet was placed between two layers of the coated fabric with the coating side in contact with the green rubber sheet to form a textile material-rubber composite. The composite was pressed between two metal plates heated to about 170° C. at about 150 psi pressure for about 30 minutes. One inch wide strips of the composite were cut, and the peel force required to separate the fabric layer from the rubber layer was determined, as described in the Woven Fabric section of ASTM D4393 "Standard Test Method for Strap Peel Adhesion of Reinforcing Cords or Fabrics to Rubber Compounds".

Example 1

In general, each formulation was made under ambient conditions according to the procedures described herein. However, furfuraldehyde-based formulations may be made and aged at slightly elevated temperature, such as from about 40° C. to about 60° C.

In a typical procedure, a small amount of base (typically NaOH and/or ammonium hydroxide) was first dissolved in a given amount of water. The phenolic condensate component (such as resorcinol-formaldehyde condensate or furfuraldehyde-resorcinol condensate) was added to the base solution under stirring until a homogeneous solution was made. The aldehyde component was slowly added to the phenolic condensate under stirring. The homogeneous solution was slowly poured into the latex component, such as vinylpyridine rubber latex, under stirring to form a mixture. The mixture was kept in a closed container at ambient temperature for about 12 to 72 hours. Other optional additives, such as antioxidants, carbon black, silica, thickeners, wetting agents, defoamers, and the like, and mixtures thereof may then be added to the mixture under stirring to form the adhesion composition, which may then be applied to a textile substrate.

| Formulation 1 | |
|---|---|
| Ingredient | Amount (parts by weight) |
| Nychem ™ 1562, a nitrile rubber latex (from Emerald Performance Materials) | 60 |
| Penacolite ® 2170, a soluble resorcinol-formaldehyde resin (from Indspec Chemical Corporation) | 4.5 |
| 2-Furfuraldehyde (from Aldrich) | 0.8 |
| Water | 20 |
| Ammonium hydroxide, 37% (from Aldrich) | 1.4 |
| Paragum 184, a thickener (from Para-Chem ®) | 7 |

Comparative Example 1

The formulation of Example 1 was used, except that 2-Furfuraldehyde was replaced with 2.2 parts of 37% formaldehyde aqueous solution.

Each of the formulations of Example 1 and Comparative Example 1 were applied to Fabric A as described herein. The treated fabrics were then combined with rubber sheets for form a textile substrate-rubber composite as described herein. The peel force was measured to be about 37.5 lb/in for Example 1, and 32.0 lb/in for Comparative Example 1. Thus, the test results illustrate that the inclusion of 2-furfuraldehyde as opposed to formaldehyde provides improved adhesion between the textile material and the rubber component.

Example 2

| Formulation 2 | |
|---|---|
| Ingredient | Amount (parts by weight) |
| Chemisat ® LCH 7302 (hydrogenated nitrile rubber latex, Zeon Chemicals) | 70 |
| Penacolite ® 2170 (from Indspec Chemical Corporation) | 4.5 |
| 2-Furfuraldehyde (from Aldrich) | 0.8 |
| Water | 20 |
| Ammonium hydroxide, 37% (from Aldrich) | 1.4 |
| Paragum 184 (from Parachem) | 7 |

Formulation 2 was applied to Fabric A as described herein. The treated fabric was then combined with rubber sheets for form a textile substrate-rubber composite as described herein. The peel force was measured to be about 30 lb/in for Example 2.

Comparative Example 2

The formulation of Example 2 was used, except that 2-Furfuraldehyde was replaced with 2.2 parts of 37% formaldehyde aqueous solution. This mixture gelled within 2 hours after the addition of formaldehyde.

Thus, an RFL formulation could not be made using the formaldehyde-containing formulation of Comparative Example 2. However, the 2-furfuraldehyde containing formulation of Example 2 was prepared and exhibited good shelf stability, as the mixture stay liquid for a several days.

In a further embodiment, a condensate was prepared by reacting 2-furfuraldehyde with resorcinol in the presence of caustic in water as described herein. The condensate was prepared as a water solution, and the weight ratio of resorcinol to 2-furfuraldehyde was from 4:3.2 to 4:4.0. It was observed that when the ratio was less than 4:3.2, the resulting condensate was not very effective in providing adhesion force improvement. However, when the ratio was greater than 4:4, the resulting condensate was unstable, and had a tendency to form an un-usable gel.

Example 3

2-Furfuraldehyde-resorcinol condensate 4 g of resorcinol (Aldrich) was dissolved in 11 g of water that contained 0.5 g of 50% sodium hydroxide solution. 3.9 g of 2-furfuraldehyde was then added slowly to the resorcinol-water-base solution. This mixture was heated to about 80° C. under stirring and maintained at 80° C. for about 2 hours. The mixture was then cooled to room temperature to yield a viscous solution of the condensate. This condensate was then incorporated into the following formulation:

| Formulation 3 | |
|---|---|
| Ingredient | Amount (grams) |
| Condensate obtained from above | 13 |
| Deionized Water | 51.9 |
| Caustic solution (50%) | 0.6 |
| 2-furfuraldehyde | 2 |

The above mixture was added to a solution prepared from 109.6 grams of Gentac® 118 (vinyl pyridine rubber latex from Omnova Solutions Inc.) and 24 grams of water.

Comparative Example 3A

The formulation of Example 3 was used, except that the condensate was replaced with 6.4 grams of Pinacolite® 2170, and 2-furfuraldehyde was replaced with 2.9 grams of formaldehyde (37%).

Comparative Example 3B

The formulation of Example 3 was used, except that the condensate was replaced with 4 grams of resorcinol, and the amount of 2-furfuraldehyde was increased to 4.5 grams.

Each of the formulations of Example 3, Comparative Example 3A, and Comparative Example 3B were applied to Fabric B as described herein. The treated fabrics were then combined with rubber sheets for form a textile substrate-rubber composite as described herein. The peel force was measured to be about 6 lb/in for Example 3, 3.7 lb/in for Comparative Example 3A, and 3.0 lb/in for Comparative Example 3B.

Example 4 and Comparative Example 4A and 4B

In another experiment, Fabric B was first padded with a solution containing Dow Corning Z-6021 (triethoxysilylpropyl ethanediamine, 1.2% by weight) and Dow Corning Z-6030 (methacryloxypropyl trimethoxysilane, 0.6% by weight) in water, and dried at 350° F. for 3 minutes. The pre-treated Fabric B was then separately padded with the formulation of Example 3 (the condensate formulation) to create Example 4, with the formulation of Comparative Example 3A to form Comparative Example 4A and with the formulation of Comparative Example 3B to form Comparative Example 4B.

The treated fabrics were then combined with rubber sheets for form a textile substrate-rubber composite as described herein. The peel force measure was to be 11.1 lb/in for Example 4, 8.8 lb/in for Comparative Example 4A and 4.0 lb/in for Comparative Example 4B. Thus, improved adhesion was observed for the 2-furfuraldehyde containing formulation when compared with the formaldehyde-containing formulation. In addition, fabric treated with the 2-furfuraldehyde containing formulation was observed to be much softer than the fabric treated with the formaldehyde-containing formulation.

Example 5

Example 1 was repeated, except that Nychem™ 1562 was replaced with 60 parts by weight of Hauthane HD 2501 (a polycarbonate polyurethane with no unsaturated double C=C bonds, available from C.L. Hauthaway & Sons Corporation). The peel force using the same fabric and green rubber as in Example 1 is about 33 lb/in. In comparison, when formaldehyde was used in place of 2-furfuraldehyde, the peel force is about 23 lb/in.

In another embodiment, a mixture comprising a resorcinol or phenol condensate, an aldehyde component as described herein such as 2-furfuraldehyde, and an elastomer latex having no unsaturated double bonds (i.e. an elastomer latex free from unsaturated double bonds) was used to treat a fabric to provide adhesion to a rubber. Typically, an RFL formulation requires a rubber latex, such as vinylpyridine-styrene-butadiene copolymer latex. The unsaturated double bonds in the rubber latex co-cure with a green rubber to provide required adhesion.

It was surprisingly discovered that, by using 2-furfuraldehyde, a treatment mixture using a latex polymer having no capability to co-cure with a rubber can still have very good adhesion. Without being bound by theory, it is believed that the diene structure in 2-furfuraldehyde is responsible for the improved adhesion to rubber.

Example 6 and Comparative Example 6

The following example is provided to illustrate the use of the adhesive composition applied to a fabric for use as a cap ply layer in an automotive tire.

A two step dipping process was used to prepare a fabric for use as cap ply layer in a tire. The first dipping formulation is provided as the following:

| Dip Formulation 1 | |
|---|---|
| Ingredient | Amount (parts by weight) |
| Gentac ® 106 (vinylpyridine-butadiene rubber latex) | 48.4 |
| NaOH (50%) | 0.26 |
| Water | 24 |
| Penacolite ® R 2170 (75%) | 2.8 |
| 50% Naugawhite ® Emulsion (50%) | 0.2 |
| 2-Furfuraldehyde | 0.85 |
| Ammonium hydroxide (13.7%) | 0.22 |
| Penacolite ® Resin I-168-L (blocked isocyanate) | 2.21 |

| Dip Formulation 2 | |
|---|---|
| Ingredient | Amount (parts by weight) |
| Dip Formulation 1 | 17.2 |
| Natural latex | 59 |
| Naugawhite ® (40% dispersion) | 1.1 |
| Modicol ® 2271 (30% dispersion of tackifier) | 13.6 |
| Litex ® S 61 (67% emulsion of SBR rubber) | 8.6 |

The purpose of Dip Formulation 1 is to provide treatment to allow sufficient adhesion of the fabric to rubber. The purpose of Dip Formulation 2 is to provide sufficient tack to the fabric so that the fabric can stick to an uncured rubber during a tire building process (i.e. it provides tack to the fabric).

For Example 6, Dip Formulation 1 was applied to Fabric C (a cap ply fabric). The fabric had a wet pick-up about 50%, and the dipped fabric was then dried in a convection lab oven at about 350° F. for 3 minutes. The treated fabric was then padded with Dip Formulation 2.

For Comparative Example 6, Fabric C was treated with Dip Formulation 1, except that 2-furfuraldehyde was replaced with 1.3 parts of 37% formaldehyde solution. The fabric was then treated with Dip Formulation 2.

The treated fabrics of Example 6 and Comparative Example 6 exhibited about 30-40 lb/in adhesion to a model tire belt compound using the same test method described above. However, Example 6 (the treated fabric with 2-furfuraldehyde in the formulation) was significantly softer, and the fabric exhibited significantly greater tack over Comparative Example 6. Greater tack enables high green adhesive strength in the processing of assembling and building a rubber composite, such as an automotive tire.

Thus, the above description and examples show that the adhesion composition of the present invention provides improved adhesion over the prior art. Such improved adhesion is provided via a composition that does not exhibit any of the problems associated with traditional formaldehyde-containing compositions of the prior art. The textile materials and other articles treated with the improved adhesion composition of the present invention possess a significant advantage over currently available prior art materials by providing a stable, more environmentally-friendly adhesion composition and which results in a treated textile material that is softer and more flexible than those treated with traditional RFL compositions. As such, the adhesion composition and textiles materials and articles treated therewith present a useful advance over the prior art.

These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the scope of the invention described in the appended claims.

I claim:

1. A method for synthesizing an improved adhesion composition comprising the steps of:
    (a) forming an aqueous mixture comprising (i) a water soluble, phenolic condensate material selected from the group consisting of a non-crosslinked phenolic condensate, a non-crosslinked resorcinol-furfuraldehyde condensate, and a phenol-formaldehyde condensate; (ii) a latex component; (iii) a base component; and (iv) an aldehyde component represented by structure (1), (2) or (3):

(1)

wherein X is selected from the group consisting of oxygen, nitrogen and sulfur;

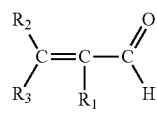

(2)

or

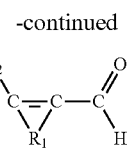

(3)

wherein $R_1$, $R_2$ and $R_3$ may be independently selected from the group consisting of alkyl, aryl, halo, hydrogen, and carboxylic functional groups;

wherein the water soluble condensate material contains sufficient resorcinol functional groups or phenol groups to allow for a reaction between the condensate material and the aldehyde component; and (b) allowing the mixture to age at room temperature for at least about 8 to 24 hours.

2. The method of claim 1, wherein the water soluble, phenolic condensate material is a resorcinol formaldehyde resin.

3. The method of claim 1, wherein the aldehyde component is represented by structure (1).

4. The method of claim 1, wherein the aldehyde component is 2-furfuraldehdye.

5. The method of claim 1, wherein the latex component is selected from the group consisting of epoxy resin, functional rubber latex, an elastomer latex having no unsaturated double bonds, unvulcanized rubber latex, and mixtures thereof.

6. The method of claim 5, wherein the latex component is unvulcanized rubber latex.

7. The method of claim 1, wherein the base component is selected from the group consisting of sodium hydroxide, potassium hydroxide, ammonium hydroxide, sodium carbonate, and mixtures thereof.

8. A method for synthesizing a resorcinolic resin comprising the steps of:
    (a) mixing 2-furfuraldehyde with a water soluble, phenolic condensate material selected from the group consisting of a non-crosslinked phenolic condensate, a non-crosslinked resorcinol-furfuraldehyde condensate, and a phenol-formaldehyde condensate;
    (b) adding a base component to the mixture of step (a);
    (c) adding a latex component to the mixture of step (b); and
    (d) allowing the mixture to age at room temperature for at least about 8 to 24 hours.

9. The method of claim 8, wherein the water soluble, phenolic condensate material is a resorcinol formaldehyde resin.

10. The method of claim 8, wherein the latex component is selected from the group consisting of epoxy resin, functional rubber latex, an elastomer latex having no unsaturated double bonds, unvulcanized rubber latex, and mixtures thereof.

11. The method of claim 10, wherein the latex component is unvulcanized rubber latex.

12. The method of claim 8, wherein the base component is selected from the group consisting of sodium hydroxide, potassium hydroxide, ammonium hydroxide, sodium carbonate, and mixtures thereof.

13. A method for synthesizing a resorcinolic resin comprising the steps of:
    (a) mixing 2-furfuraldehyde with a water soluble, non-crosslinked resorcinol-formaldehyde condensate material;
    (b) adding a base component to the mixture of step (a);
    (c) adding a latex component to the mixture of step (b); and
    (d) allowing the mixture to age at room temperature for at least about 8 to 24 hours.

14. The method of claim 13, wherein the latex component is selected from the group consisting of epoxy resin, functional rubber latex, an elastomer latex having no unsaturated double bonds, unvulcanized rubber latex, and mixtures thereof.

15. The method of claim 14, wherein the latex component is unvulcanized rubber latex.

16. The method of claim 13, wherein the base component is selected from the group consisting of sodium hydroxide, potassium hydroxide, ammonium hydroxide, sodium carbonate, and mixtures thereof.

* * * * *